G. NEILSON.
Coffee Pot.
No. 29,302.
Patented July 24, 1860.
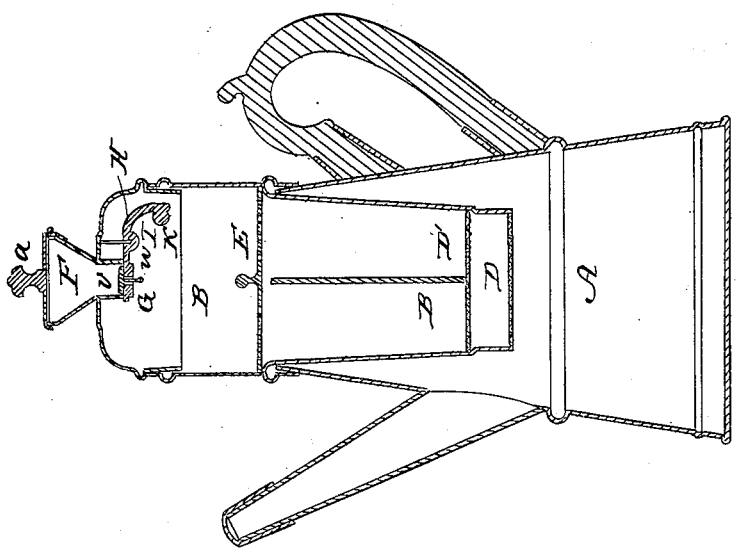
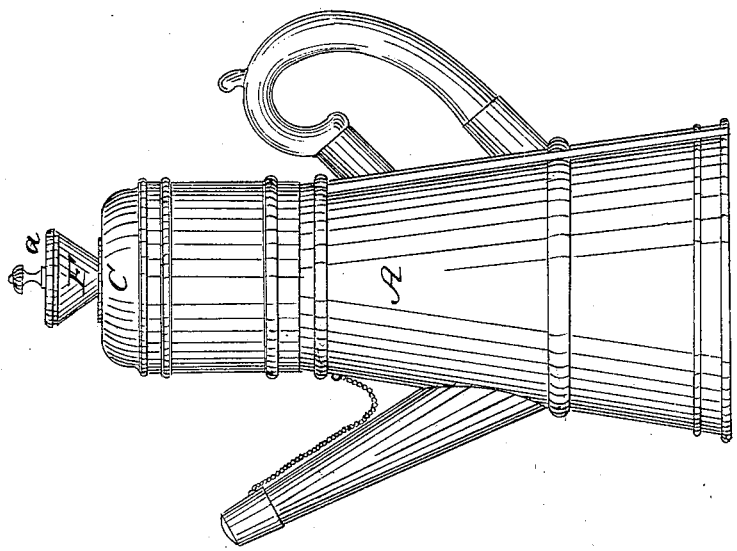

UNITED STATES PATENT OFFICE.

GEORGE NEILSON, OF BOSTON, MASSACHUSETTS.

COFFEE-POT.

Specification of Letters Patent No. 29,302, dated July 24, 1860.

*To all whom it may concern:*

Be it known that I, GEORGE NEILSON, of Boston, in the county of Suffolk and State of Massachusetts, have invented an Improvement in Coffee-Pots, and do hereby declare the same to be fully described and represented in the following specification and the accompanying drawings, of which—

Figure 1, is a side elevation and Fig. 2, a vertical section of a coffee-pot provided with my invention.

My invention consists in a combination and arrangement of a receiving tunnel, valve and weighted lever or its equivalent with the coffee-pot or cover of the coffee holder thereof, the object of the improvement being to enable the coffee-pot to be supplied with water without loss of the aroma of the decoction of coffee that may be within the apparatus. Also, in combining with such tunnel, valve and weighted lever, a small secondary or safety opening and valve applied to the tunnel valve, the same being in order to prevent explosion of the coffee-pot.

In the drawings, A, denotes the coffee-pot, while B, is the coffee carrier or holder, placed in the top of the pot and closed by a cover C. The lower part of the coffee holder, B, is provided with one or more strainers, D, D'. It also has a straining diaphragm, E, which is intended to stand over the coffee and to receive the water and direct it upon the mass. The cover, C, is provided with a tunnel or spout F, which serves as a handle to the cover. This tunnel is furnished with a cover, *a*, hinged to it and furthermore, its lower end or discharging mouth is supplied with a valve G, that is attached to one arm of a lever, H, which turns on a fulcrum I, and has a counter balance weight, K, carried by or making part of the other arm. This weight serves to keep the valve up to its seat, when water may not be flowing through the tunnel. The weight, however, should be such as to allow the valve to move away from its seat under the pressure of water while being poured into the tunnel and into the coffee-pot will seal the valve opening so as to prevent the escape of the aroma of the coffee, and thus I have provided a means by which the coffee-pot at any time may be supplied with water without the loss of the aroma.

The secondary or small safety valve is shown at *v*, as placed in the valve G, and having its opening, *w*, made through the said valve, G. In case, the pressure of steam should become too high, the safety valve will open and discharge such steam and thus prevent explosion of the coffee-pot.

I claim—

1. The combination and arrangement of the receiving tunnel F, its valve G, and weighted lever, H, or its equivalent, with the coffee-pot or the cover of its coffee holder the same being for the purpose and to operate as described.

2. The combination and arrangement of the safety valve *v*, and opening, *w*, with the tunnel, its valve and weighted lever, applied to the coffee-pot as stated.

GEORGE NEILSON.

Witnesses:
R. M. EDDY,
F. P. HALE, Jr.